(12) United States Patent  
Sugiyama

(10) Patent No.: US 11,110,853 B2  
(45) Date of Patent: Sep. 7, 2021

(54) VEHICLE HEADLIGHT SYSTEM

(71) Applicant: Stanley Electric Co., Ltd., Tokyo (JP)

(72) Inventor: Takashi Sugiyama, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 93 days.

(21) Appl. No.: 16/619,002

(22) PCT Filed: Jun. 1, 2018

(86) PCT No.: PCT/JP2018/021229  
§ 371 (c)(1),  
(2) Date: Dec. 3, 2019

(87) PCT Pub. No.: WO2018/225653  
PCT Pub. Date: Dec. 13, 2018

(65) Prior Publication Data  
US 2021/0078486 A1 Mar. 18, 2021

(30) Foreign Application Priority Data  
Jun. 7, 2017 (JP) .............................. JP2017-112413

(51) Int. Cl.  
*F21S 41/64* (2018.01)  
*F21S 41/663* (2018.01)  
*B60Q 1/14* (2006.01)

(52) U.S. Cl.  
CPC ........... *B60Q 1/143* (2013.01); *B60Q 1/1438* (2013.01); *B60Q 2300/112* (2013.01)

(58) Field of Classification Search  
CPC .............. B60Q 1/143; B60Q 1/1438; B60Q 2300/112; F21S 41/143; F21S 41/645  
See application file for complete search history.

(56) References Cited

U.S. PATENT DOCUMENTS

2004/0021626 A1 2/2004 Shimizu  
2009/0279316 A1\* 11/2009 Hikmet ................. F21S 41/645  
                                                362/465

(Continued)

FOREIGN PATENT DOCUMENTS

JP      H03-205703 A     9/1991  
JP      H07-108873 A     4/1995

(Continued)

OTHER PUBLICATIONS

International Search Report for PCT/JP2018/021229 dated Jul. 24, 2018.

*Primary Examiner* — Henry Luong  
(74) *Attorney, Agent, or Firm* — Kenealy Vaidya LLP

(57) ABSTRACT

To prevent a decrease in luminance of the flashed high-beam headlights caused by ambient temperature in a vehicle headlight system using a liquid crystal element. The vehicle headlight system for selectively irradiating light in front of an own vehicle includes: a light source; a liquid crystal element for forming an image using light from the light source where the liquid crystal element is a normally closed liquid crystal element having a relatively low transmittance when no voltage is applied thereto; a driving circuit for driving the liquid crystal element; and a control part that determines whether or not the light source is in a light-off state and controls the driving circuit to set the liquid crystal element to a transmission state when the light source is in the light-off state.

4 Claims, 3 Drawing Sheets

(56) References Cited

U.S. PATENT DOCUMENTS

2016/0169469 A1 6/2016 Sugiyama
2018/0259146 A1 9/2018 Sugiyama

FOREIGN PATENT DOCUMENTS

| JP | 2004-69788 A | 3/2004 |
| JP | 2010-91782 A | 4/2010 |
| JP | 2011-75800 A | 4/2011 |
| JP | 2012-69458 A | 4/2012 |
| JP | 2016-115412 A | 6/2016 |
| WO | 2011/021688 A1 | 2/2011 |

* cited by examiner

VEHICLE HEADLIGHT SYSTEM

CROSS-REFERENCE TO RELATED APPLICATIONS

This application is a U.S. National Stage Application under 35 U.S.C. § 371 of International Patent Application No. PCT/JP2018/021229 filed Jun. 1, 2018, which claims the benefit of priority to Japanese Patent Application No. 2017-112413 filed Jun. 7, 2017, the disclosures of all of which are hereby incorporated by reference in their entireties.

BACKGROUND OF THE INVENTION

Field of the Invention

The present invention relates to a technique for controlling vehicle headlights that perform selective light irradiation corresponding to the position of a forward vehicle or the like.

Description of the Background Art

There is known a vehicle headlight system that selectively irradiates light by setting the irradiation range and the non-irradiation range of light from the headlight units of an own vehicle according to the position of the oncoming vehicle or the preceding vehicle (referred to as "forward vehicle" in the specification) existing in front of the own vehicle. A prior art related to such a vehicle headlight system is disclosed in, for example, Japanese Unexamined Patent Application Publication No. H07-108873. In this type of a vehicle headlight system, a camera is installed at a predetermined position in front of the own vehicle (for example, the upper center of the windshield), and the position of the vehicle body, the taillight, or the headlight of the forward vehicle captured by the camera are detected by image processing. Then, light distribution control is performed so that the detected portion of the forward vehicle is not irradiated with the light from the headlight units of the own vehicle. Further, it is known to use a liquid crystal element to control the irradiation range and the non-irradiation range of light (for example, refer to Japanese Unexamined Patent Application Publication No. 2016-115412).

Now, in the vehicle headlight system as described above, for example, when selective light irradiation is not performed, specifically, when the vehicle headlights are all turned off during the day or when only a low beam is emitted corresponding to the presence, etc. of the forward vehicle, there are situations where the driver would want to flash high-beam headlights. Here, for example, if a normally closed liquid crystal element that shields light when no voltage is applied is used as the liquid crystal element, high-beam headlights are flashed by setting the liquid crystal element to a light transmission state and turning on the light source instantaneously to emit light.

However, in general, the response speed of the liquid crystal element is not so high, and the response speed is significantly reduced when the ambient temperature becomes low. Thus, for example, when the ambient temperature falls below the freezing point, time required for each pixel of the liquid crystal element to transit to the transmission state becomes long.

Therefore, during the relatively short time in which the light source is turned on in order to flash high-beam headlights, there is a possibility that the transmittance of the liquid crystal element does not become high enough, which may reduce the luminance of the flashed high-beam headlights.

In a specific aspect, it is an object of the present invention to provide a technique for preventing a decrease in luminance of the flashed high-beam headlights caused by ambient temperature in a vehicle headlight system using a liquid crystal element.

SUMMARY OF THE INVENTION

A vehicle headlight system according to one aspect of the present invention is a vehicle headlight system for selectively irradiating light in front of an own vehicle including: (a) a light source; (b) a liquid crystal element for forming an image using light from the light source where the liquid crystal element is a normally closed liquid crystal element having a relatively low transmittance or reflectance when no voltage is applied thereto; (c) a driving circuit for driving the liquid crystal element; and (d) a control part that determines whether or not the light source is in a light-off state and controls the driving circuit to set the liquid crystal element to either a transmission state or a reflection state when the light source is in the light-off state.

According to the above configuration, it is possible to prevent a decrease in luminance of the flashed high-beam headlights caused by ambient temperature in a vehicle headlight system using a liquid crystal element.

DESCRIPTION OF THE PREFERRED EMBODIMENTS

Embodiment 1

Figure 1:
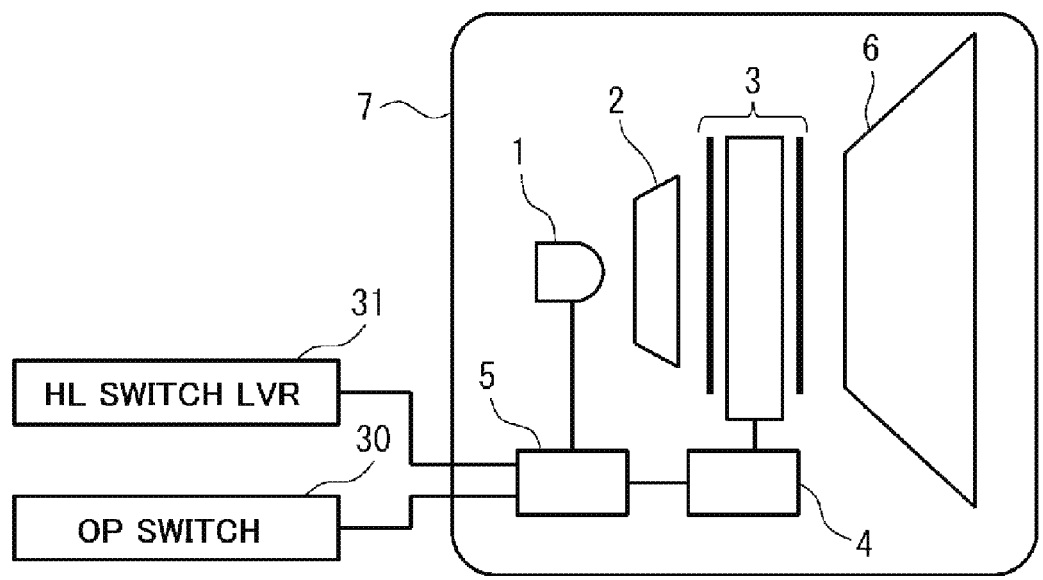
FIG. 1 is a diagram illustrating a configuration of a vehicle headlight system according to embodiment 1.

FIG. 1 is a diagram illustrating a configuration of a vehicle headlight system according to embodiment 1. The vehicle headlight system shown in FIG. 1 is configured to include a light source 1, a parallel optical system 2, a liquid crystal element 3, a driving circuit 4, a control part 5, and a projection optical system 6. Each component is accommodated in a housing 7, for example. This vehicle headlight system is configured to perform selective light irradiation corresponding to the position of the forward vehicle or pedestrians, etc. existing around the own vehicle, and sets a predetermined range including the position of the forward vehicle, etc. as a non-irradiation range and sets the range other than the predetermined range as a light irradiation range.

The light source 1 is configured to include, for example, a white light LED configured by combining a yellow phosphor in a light emitting element (LED) that emits blue light. Here, instead of the above-mentioned LED, light source commonly used in a headlight unit for vehicles such as a laser, a light bulb or a discharge lamps can be used for the light source 1.

The parallel optical system 2 converts light emitted from the light source 1 into substantially parallel light, and for example, a convex lens can be used. In this case, it is possible to create parallel light by arranging the light source 1 near the focal point of the convex lens. Here, as the parallel optical system 2, a lens, a reflecting mirror, or a combination thereof can be used.

The liquid crystal element 3 has, for example, a plurality of individually controllable pixel regions (light modulating regions), and the transmittance of each pixel region is variably set according to the magnitude of the voltage applied to the liquid crystal layer provided by the driving circuit 4. By transmitting light from the light source 1 to the liquid crystal element 3, an image having brightness and darkness corresponding to the light irradiation range and the non-irradiation range described above is formed. The liquid crystal element 3 of the present embodiment is a so-called normally closed type (normally black type) liquid crystal element where its light transmittance is extremely low (light shielding state) when the voltage to the liquid crystal layer is not applied (or a voltage is equal to or lower than the threshold value) and its light transmittance is relatively high (transmission state) when the voltage to the liquid crystal layer is applied.

The driving circuit 4 supplies a driving voltage to the liquid crystal element 3 based on the control signal supplied from the control part 5, thereby individually controlling the alignment state of the liquid crystal layer in each pixel region of the liquid crystal element 3.

The control part 5 detects the position of the forward vehicle or the like by performing image processing based on the image obtained by the camera (not shown in the figure) photographing the front space of the vehicle, sets a light irradiation range and a non-irradiation range according to the detected position of the forward vehicle or the like, and generates a control signal for forming an image corresponding to the light irradiation range and the non-irradiation range and supplies the control signal to the driving circuit 4. Further, during the period in which the own vehicle is in operation and the light source 1 is in a light-off state, the control part 5 generates a control signal for setting a predetermined number (for example, all pixel regions) among the plurality of pixel regions of the liquid crystal element 3 to be in a transmission state and supplies the control signal to the driving circuit 4. The control part 5 carries out a predetermined operation program in a computer system comprising a CPU, a ROM, a RAM, and the like, for example.

The projection optical system 6 enlarges the image formed by the light transmitted through the liquid crystal element 3 (the image having bright and dark portions each corresponding to the light irradiation range and the non-irradiation range) so as to provide light distribution suited for the headlights and projects the image forward of the own vehicle, and a suitably designed lens is used. Here, as the projection optical system 6, a lens, a reflecting mirror, or a combination thereof can be used.

Figure 2:
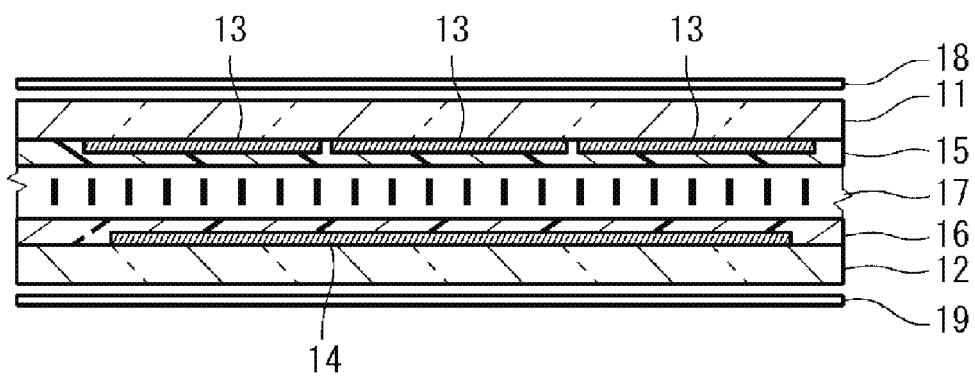
FIG. 2 is a schematic cross-sectional view illustrating a configuration example of a liquid crystal element.

FIG. 2 is a schematic cross-sectional view illustrating a configuration example of a liquid crystal element. The liquid crystal element 3 shown in FIG. 2 is configured to include an upper substrate 11 and a lower substrate 12 disposed facing each other, a plurality of first electrodes 13 provided to the upper substrate 11, a plurality of second electrodes 14 provided to the lower substrate 12, a first alignment film 15 provided to the upper substrate 11, a second alignment film 16 provided to the lower substrate 12, a liquid crystal layer 17 disposed between the upper substrate 11 and the lower substrate 12, and a pair of polarizers 18 and 19.

Each of the upper substrate 11 and the lower substrate 12 is a rectangular substrate in a plan view, disposed facing each other. As for each substrate, a transparent substrate, such as a glass substrate, plastic substrate, or the like may be used, for example. A plurality of spacers is dispersed uniformly and arranged between the upper substrate 11 and the lower substrate 12, for example, and as a result of these spacers, a predetermined gap (approximately a few μm, for example) is maintained between the two substrates.

Each of the first electrodes 13 is provided, for example, on one surface side of the upper substrate 11 and extend in a direction perpendicular to the paper surface of the figure and comprises a plurality of conductive films arranged in the left-right direction in the figure. Each of the second electrodes 14 is provided, for example, on one surface side of the lower substrate 12 and extend in the left-right direction in the figure and comprises a plurality of conductive films arranged in the direction perpendicular to the paper surface of the figure. Each region where each first electrode 13 and each second electrode 14 overlap constitutes the aforementioned pixel region (light modulation region). Each electrode is configured, for example, by suitably patterning a transparent conductive film made of indium tin oxide (ITO) or the like. Although not shown in the figure, an insulating film may be provided on the upper surface of each of the electrodes.

The first alignment film 15 is provided onto one surface of the upper substrate 11 so as to cover the first electrode 13. The second alignment film 16 is provided onto one surface of the lower substrate 12 so as to cover the second electrode 14. As each of the alignment films, a vertical alignment film which controls the alignment state of the liquid crystal layer 17 in the vertical direction is used. A uniaxial orientation process such as rubbing treatment is performed on each of the alignment films, thereby achieving alignment regulating force in one direction. The alignment treatment directions of the respective alignment films is set so as to be staggered (anti-parallel), for example.

The liquid crystal layer 17 is provided between the upper substrate 11 and the lower substrate 12. In this embodiment, the liquid crystal layer 17 is configured using a liquid crystal material having fluidity with a dielectric constant anisotropy $\Delta\varepsilon$ being negative, and with no chiral material contained. The liquid crystal layer 17 of this embodiment is in a state where the alignment direction of the liquid crystal molecules is inclined to one direction when no voltage is applied, and is substantially vertically aligned having a pretilt angle of 88° or more and less than 90° with respect to each substrate surface.

The pair of polarizers 18 and 19 are disposed so that the respective absorption axes are substantially perpendicular to each other, and are disposed opposing each other with the upper substrate 11 and the lower substrate 12 interposed therebetween. In this embodiment, a normally closed mode is assumed, which is an operation mode in which light is shielded (transmittance is extremely low) when no voltage is applied to the liquid crystal layer 17.

In a plan view of the substrate, the liquid crystal element 3 has six first electrodes 13 each extending in the vertical direction and arranged in the left-right direction, and has 48 second electrodes 14 each extending in the left-right direction and arranged in the vertical direction, for example. There are 288 pixel regions, each of which is a region where each first electrode 13 and each second electrode 14 overlap in a plan view, and these pixel regions are arranged in a matrix. The driving circuit 4 is connected to each first electrode 13 and each second electrode 14 and performs, for example, simple matrix drive (multiplex drive) with a ⅙ duty.

Figure 3A:
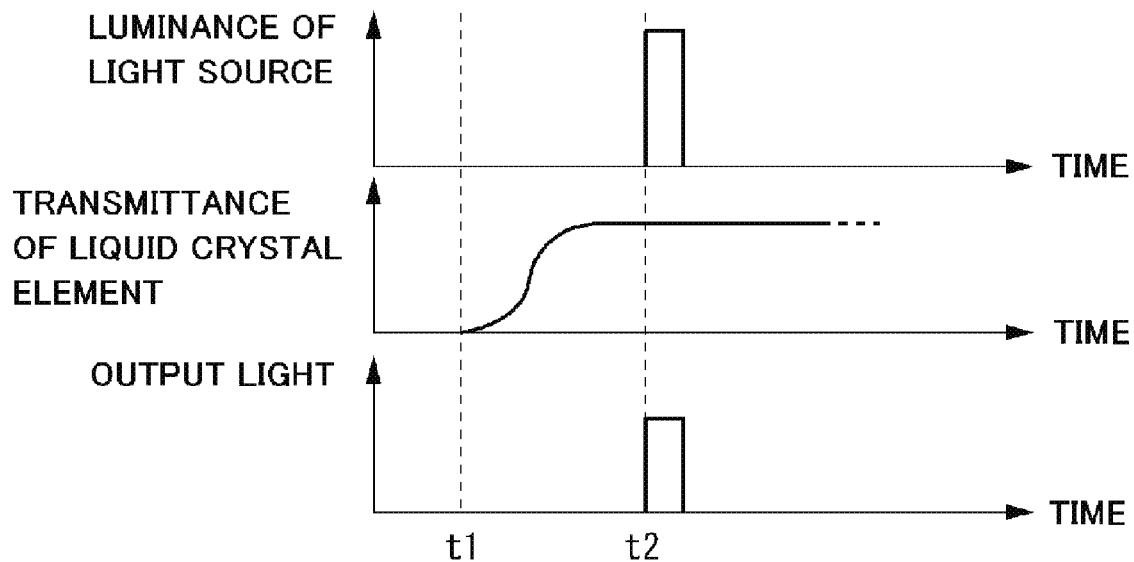
FIG. 3A is a time chart for explaining the operation of the vehicle headlight system.
Figure 3B:
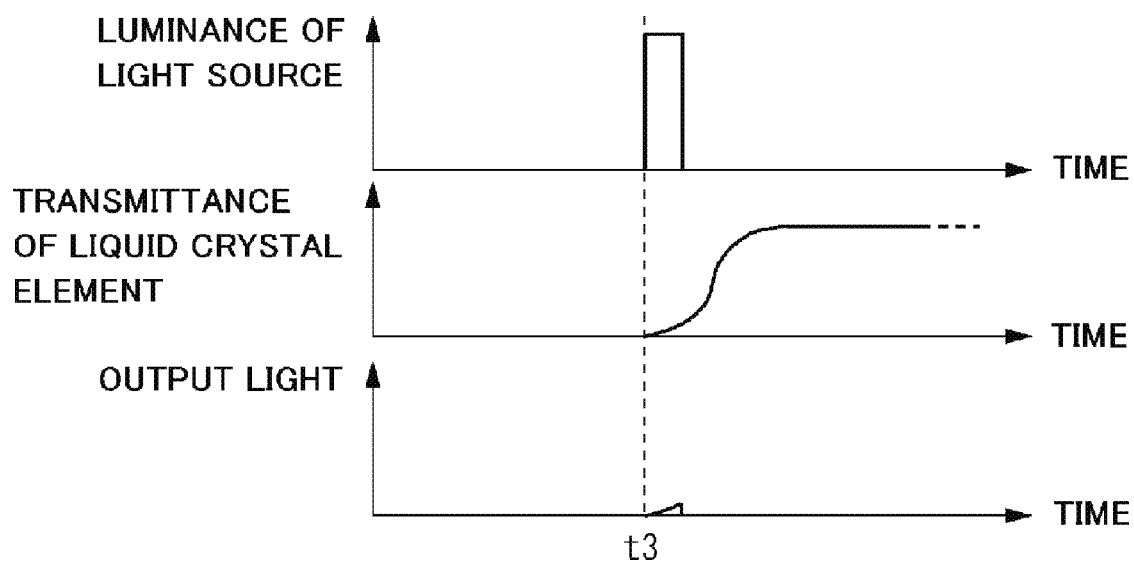
FIG. 3B is a time chart of a comparative example.

FIG. 3A is a time chart for explaining the operation of the vehicle headlight system. FIG. 3B is a time chart of a comparative example. Hereinafter, with reference to these time charts, the operation when irradiating so-called passing light during a period in which the light source 1 is in the light-off state in the vehicle headlight system of the present embodiment will be described in detail. Here, "passing light" refers to the light generated by instantaneously switching on the headlights' high beams.

The control part 5 determines whether or not the own vehicle is in an operating state. Here, the operating state refers to a state in which the vehicle is capable of traveling according to the driving device operated by the driver. Whether or not the vehicle is in the operating state can be determined, for example, by detecting whether or not the operation switch 30 (abbreviated as OP SWITCH in FIGS. 1 and 4) has been turned on. Here, the operation switch 30 refers to a means for performing an operation to bring the vehicle into a travelable state, such as a push button or an ignition key.

When the control part 5 determines that the own vehicle is in an operating state, it determines whether or not the light source 1 is in a light-on state. This determination can be made by detecting the state of the headlight switch lever 31 (abbreviated as HL SWITCH LVR in FIGS. 1 and 4) provided in the vehicle, for example. Here, the headlight switch lever 31 is a means that is installed, for example, around the steering wheel of the vehicle and performs operations such as turning on and off the headlights and flashing high-beam headlights.

When the own vehicle is in an operating state and the light source 1 is not in a light-on state (when the light source 1 is in a light-off state), the control unit 5 generates a control signal in order to set a predetermined number (for example, all pixel regions) of the plurality of pixel regions of the liquid crystal element 3 to a transmission state and sends the signal to the driving circuit 4. Thereby, at a certain time t1, the predetermined number of pixel regions of the liquid crystal element 3 transit from the light shielding state to the light transmission state, and the transmittance becomes high so that the light from the light source 1 can be transmitted.

While the own vehicle is in the operating state and the light source 1 is in the light-off state, this state is maintained. And at a certain time t2, when the headlight switch lever 31 is operated by the driver so as to flash the passing light (high-beam lights), the luminance of the emitted light from the light source 1 instantaneously increases accordingly. At this time, since the predetermined number of pixel regions of the liquid crystal element 3 has already transited to the light transmission state, a high-luminance output light can be obtained instantaneously since the light emitted from the light source 1 passes through the liquid crystal element 3 and is projected forward of the own vehicle by the projection optical system 6. That is, a superior quality passing light is generated without causing a delay in the response speed of the liquid crystal element 3. Here, in general, since the liquid crystal element 3 is a voltage-driven element, electrical current hardly flows, and the power consumption is extremely low even when a driving voltage is continuously applied to transit the liquid crystal element 3 to a light transmission state, therefore, this does not become a problem in practical use.

In contrast to such an embodiment, as shown in the time chart of the comparative example in FIG. 3B, when each pixel region of the liquid crystal element 3 is switched to the light transmission state according to the operation of the headlight switch lever 31 so as to flash the passing light at a certain time t3, a delay in the response speed of the liquid crystal element 3 occurs, and light emission from the light source 1 ends prior to the transmittance increase of the liquid crystal element 3. Thus, the luminance of the passing light projected forward of the own vehicle becomes very low. Such a delay in the response speed of the liquid crystal element 3 becomes more prominent as the ambient temperature of the vehicle headlight system becomes lower, and the delay time may be several seconds in an extremely cold environment of minus several tens of degrees Celsius, for example.

Embodiment 2

Figure 4:
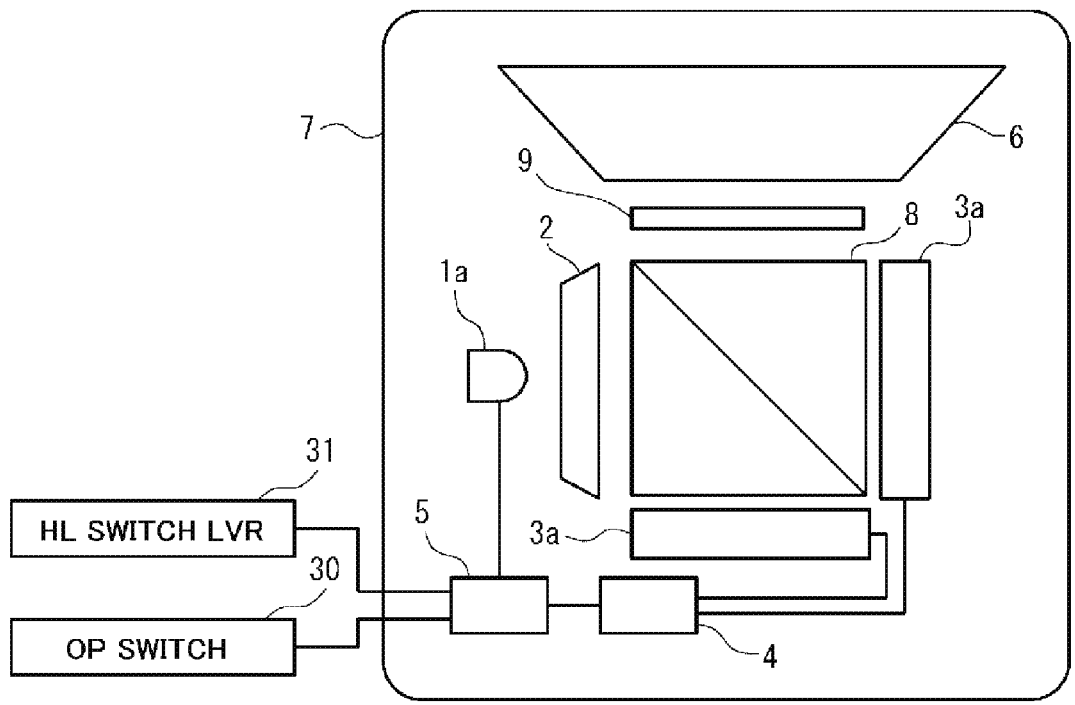
FIG. 4 is a diagram illustrating a configuration of a vehicle headlight system according to embodiment 2.

FIG. 4 is a diagram illustrating a configuration of a vehicle headlight system according to embodiment 2. The vehicle headlight system shown in FIG. 4 is configured to include a light source 1a, a parallel optical system 2, two liquid crystal elements 3a, a driving circuit 4, a control part 5, a projection optical system 6, a polarization beam splitter 8, and a phosphor 9. Each component is accommodated in a housing 7, for example.

The vehicle headlight system of embodiment 2 has a similar configuration as that described in FIG. 10 in the above-mentioned Japanese Unexamined Patent Application Publication No. 2016-115412 and this vehicle headlight system is configured to perform selective light irradiation corresponding to the position of the forward vehicle or pedestrians, etc. existing around the own vehicle, and sets a predetermined range including the position of the forward vehicle, etc. as a non-irradiation range and sets the range other than the predetermined range as a light irradiation range. Here, in the following description, the same reference numerals are used for components common to the system of embodiment 1, and detailed descriptions thereof are omitted.

The light source 1a emits light having a single wavelength, and is configured to include a light emitting element (LED) that emits blue light, for example.

The polarization beam splitter 8 separates the outgoing light from the parallel optical system 2 into a P-wave and an S-wave. As for the polarizing beam splitter 8, for example, a material using a dielectric multilayer film corresponding to the wavelength band of the light source 1a can be used. Examples of such a polarizing beam splitter 8 include a polarizing beam splitter manufactured by SIGMAKOKI CO., LTD.

Each liquid crystal element 3a has, for example, a plurality of individually controllable pixel regions (light modulating regions), and the transmittance of each pixel region is variably set according to the magnitude of the voltage applied to the liquid crystal layer provided by the driving circuit 4. Also in this embodiment, each liquid crystal element 3a is a so-called normally closed type (normally black type) liquid crystal element. Further, each liquid crystal element 3a in the present embodiment is a reflection type liquid crystal element. Each liquid crystal element 3a reflects one polarized light emitted from the polarization beam splitter 8 without or with its polarization direction rotated, according to the magnitude of the voltage applied to the liquid crystal layer. Thus, the liquid crystal element 3a is provided with a reflective film made of aluminum on the outside or the inside of the lower substrate 12 (refer to FIG. 2), for example. The structure other than the reflective film is similar to that shown in FIG. 2.

One liquid crystal element 3a is for controlling the S-wave separated by the polarization beam splitter 8, and is disposed on the lower side of the polarization beam splitter 8 in the figure. The other liquid crystal element 3a is for controlling the P-wave separated by the polarization beam splitter 8, and is disposed on the right side of the polarization beam splitter 8 in the figure.

When vertically aligned liquid crystal elements are used for the two liquid crystal elements 3a, since the retardation when no voltage is applied to the liquid crystal layer is zero, the incident polarized light can be reflected and emitted without any changes (without rotating the polarization direction), thereby there is an advantage that the dark state of the illumination light can be darkened most. Further, when a voltage is applied to the liquid crystal layer, the incident polarized light is rotated by 90 degrees and reflected and emitted, so that a bright state of illumination light can be created. These two states can be switched based on the driving voltage supplied from the driving circuit 4. The polarization can be rotated 90 degrees by adjusting retardation of each of the vertical alignment type liquid crystal element 3a to a quarter wavelength, but the retardation value differs depending on the wavelength of the incident light, that is, it is dependent on the wavelength. However, in this embodiment, since a light source emitting a single wavelength light is used as the light source 1a, it is not necessary to consider wavelength dependency.

The phosphor 9 is arranged so that the emitted light from the polarization beam splitter 8 is incident thereon, and emits light (fluorescence) with a wavelength different from the wavelength of the single wavelength light excited and generated by the incident single wavelength light. As for the phosphor 9, for example, a phosphor plate obtained by mixing and bake hardening a YAG phosphor and a scattering substance, or a transparent substrate coated with a fluorescence substance can be used. A partial component of the single wavelength light (blue light) reflected from each liquid crystal element 3a and again passing through the polarization beam splitter 8 excites the phosphor 9 to emit yellow light, and the remaining component of the blue light is emitted as it is from the phosphor 9. At this time, the yellow light becomes scattered light from the phosphor 9, and the blue light also becomes scattered light due to the scattering substance, and they are mixed and emitted from the phosphor 9 as white scattered light.

The projection optical system 6 enlarges the image (the image having bright and dark portions each corresponding to the light irradiation range and the non-irradiation range) formed by the scattered light that has passed through the phosphor 9 so as to provide light distribution suited for the headlights and projects the image forward of the own vehicle.

Figure 5:
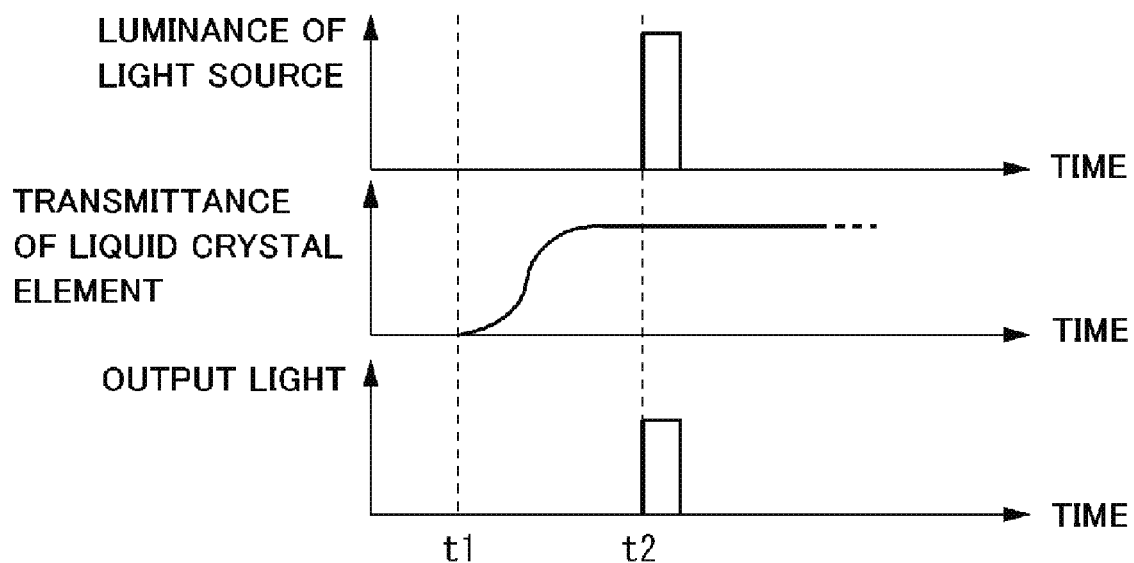
FIG. 5 is a time chart for explaining the operation of the vehicle headlight system.

FIG. 5 is a time chart for explaining the operation of the vehicle headlight system. Hereinafter, with reference to the time chart, the operation when irradiating so-called passing light during the period in which the light source 1a is in the light-off state in the vehicle headlight system of the present embodiment will be described in detail.

The control part 5 determines whether or not the own vehicle is in an operating state, and when the control part 5 determines that the vehicle is in the operating state, it determines whether or not the light source 1a is in a light-on state. And when the vehicle is in the operating state and the light source 1a is not in a light-on state (when the light source 1a is in a light-off state), the control unit 5 generates a control signal in order to set a predetermined number (for example, all pixel regions) of the plurality of pixel regions of each liquid crystal element 3a to a reflection state and provides the signal to the driving circuit 4. Thus, at a certain time t1, the predetermined number of pixel regions of each liquid crystal element 3a transit from the light shielding state to the light reflection state, and the reflectance becomes high so that the light incident from the light source 1a via the polarization beam splitter 8 can be reflected.

While the own vehicle is in the operating state and the light source 1a is in the light-off state, this state is maintained. And at a certain time t2, when the headlight switch lever 31 is operated by the driver so as to flash the passing light, the luminance of the emitted light from the light source 1a instantaneously increases accordingly. At this time, since the predetermined number of pixel regions of the liquid crystal element 3 has already transited to the light reflection state, a high-luminance output light can be obtained instantaneously because the light emitted from the light source 1a is reflected by the liquid crystal element 3a via the beam splitter 8, and passes through the beam splitter 8 and the phosphor 9, and is further projected forward of the vehicle by the projection optical system 6. That is, similar to embodiment 1, in this embodiment, a superior quality passing light is generated without causing a delay in the response speed of the liquid crystal element 3a.

Here, in the second embodiment, only one of the liquid crystal elements 3a may be maintained in a reflection state. In this case, although the luminance of the passing light becomes relatively small, the power consumption can be further reduced.

According to each embodiment as described above, it is possible to prevent a decrease in luminance of the passing light caused by ambient temperature in a vehicle headlight system using a liquid crystal element. Further, by controlling the liquid crystal element to the transmission state or the reflection state when the vehicle is in a travelable state, power consumption required for driving the liquid crystal element can be reduced.

It should be noted that this invention is not limited to the subject matter of the foregoing embodiment, and can be implemented by being variously modified within the scope of the present invention as defined by the appended claims. For example, in each of the embodiments described above, although a vertical alignment type liquid crystal element is illustrated as a configuration example of the liquid crystal element, the configuration of the liquid crystal element is not limited thereto. The liquid crystal element may be a normally closed type that shields light when no voltage is applied, and for example, a TN type or STN type liquid crystal element may be used.

Further, in each of the embodiments described above, the system determines whether the own vehicle is in operation based on the operation switch, and the liquid crystal element is controlled to be in a transmission state or a reflection state when the vehicle is in operation and the light source is in a light-off state. Alternatively, the liquid crystal element may be controlled by determining that the vehicle is operating when the vehicle is in a traveling state based on the vehicle speed signal or the like. Thereby, the power consumption required for driving the liquid crystal element can be further reduced.

What is claimed is:

1. A vehicle headlight system for selectively irradiating light in front of an own vehicle comprising:
a light source;
a liquid crystal element for forming an image using light from the light source where the liquid crystal element is a normally closed liquid crystal element having a relatively low transmittance or reflectance when no voltage is applied thereto;
a driving circuit for driving the liquid crystal element; and
a control part that determines whether or not the light source is in a light-off state and controls the driving circuit to set the liquid crystal element to either a transmission state or a reflection state when the light source is in the light-off state.

2. The vehicle headlight system according to claim 1, wherein the control part controls the driving circuit to further determine whether or not the own vehicle is in operation, and drives the liquid crystal element to the transmission state or the reflection state when the own vehicle is in operation and the light source is in the light-off state.

3. The vehicle headlight system according to claim 2, wherein the control part determines whether or not the own vehicle is in operation based on a state of an operation switch of the vehicle.

4. The vehicle headlight system according to claim 2, wherein the control part determines whether or not the own vehicle is in operation based on the vehicle speed of the own vehicle.

\* \* \* \* \*